United States Patent [19]

Banta

[11] Patent Number: 4,679,350

[45] Date of Patent: Jul. 14, 1987

[54] PLANT GROWING SHELTER

[76] Inventor: Maynard A. Banta, 11291 Weatherby Rd., Los Alamitos, Calif. 90720

[21] Appl. No.: 918,716

[22] Filed: Oct. 14, 1986

[51] Int. Cl.$^4$ ............................................. A01G 13/04
[52] U.S. Cl. ............................................ 47/29; 47/17
[58] Field of Search ................. 47/26, 28, 28.1, 29, 47/30, 17, 19

[56] References Cited

U.S. PATENT DOCUMENTS

| 3,124,903 | 3/1964 | Trubar | 47/17 |
| 4,166,339 | 9/1979 | Heller et al. | 47/17 |

Primary Examiner—Robert A. Hafer
Assistant Examiner—Bradley M. Lewis
Attorney, Agent, or Firm—Gausewitz, Carr & Rothenberg

[57] ABSTRACT

A shelter providing a closed, isolated and controlled environment for growing plants is formed of an inflated plastic tube having a bed of particulate material on the bottom of the tube and a number of plant containers on the particulate material bed. A combined air return, thermal insulating duct and sun shade for the tube is formed by a thin, flexible shade sheet of decreased light transmissivity having a peripheral edge continuously secured to the periphery of the tube along an area intermediate the top and bottom of the tube. The tube, and the air duct that is formed between the shade sheet and the top of the tube, are inflated by blowing air into one end of the tube, and flowing air from the other end of the tube into the space between the shade sheet and the top of the tube to be returned through the air duct back to the blower. Air in the shelter is conditioned by suitable filters or heating or cooling devices at the blower. The return duct enables recirculation of air needed for conditioning and concomitantly provides a controlled and conditioned thermal insulation air mass and sun shade. Access to the interior of the tube for working with plants growing therein is readily available through slits in the tube side which may remain sealed or unsealed. Similarly, the small amounts of required water may be introduced by inserting water projecting nozzles through holes conveniently punctured in the tube wall.

21 Claims, 5 Drawing Figures

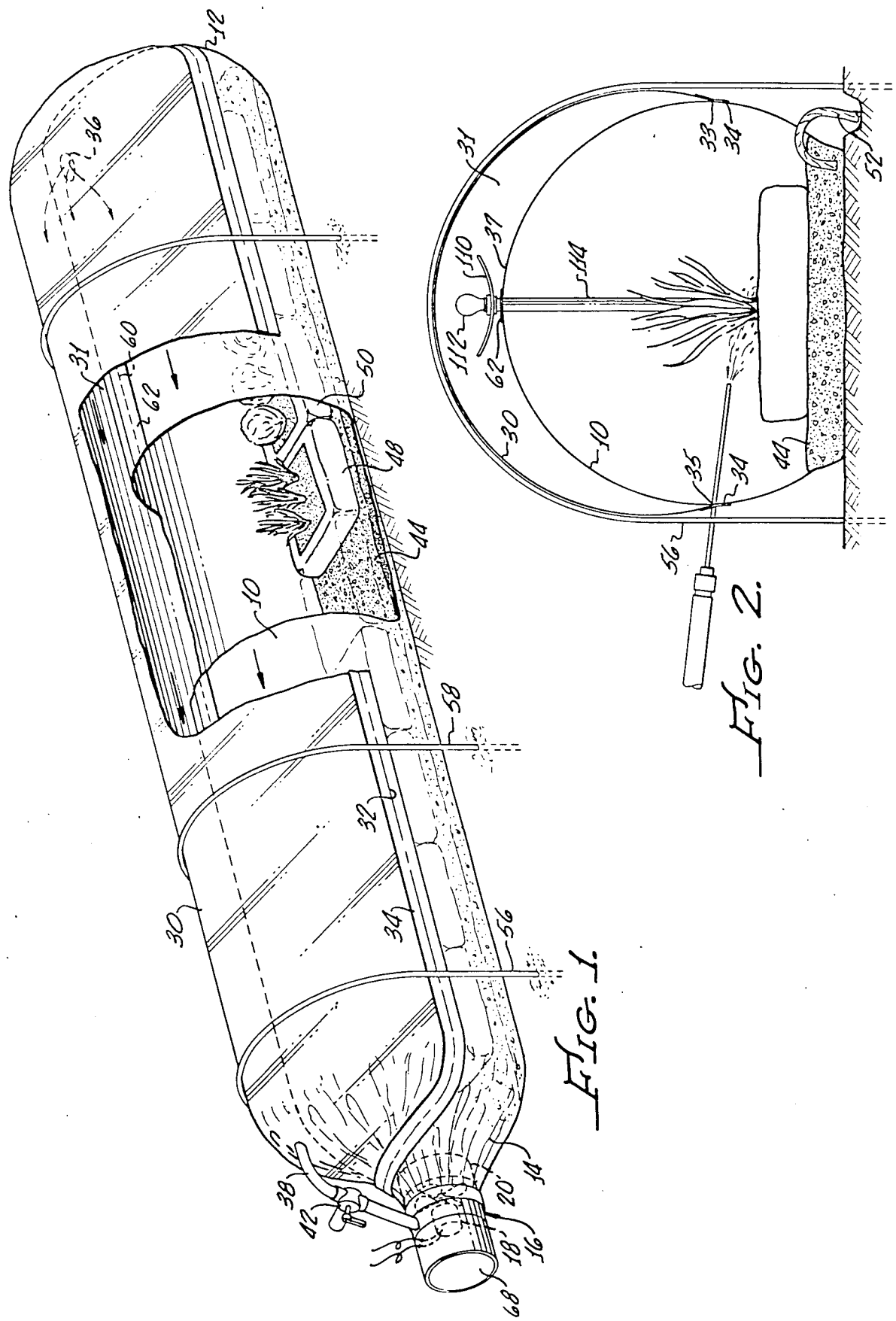

/ 1

PLANT GROWING SHELTER

BACKGROUND OF THE INVENTION

The present invention relates to the growing of plants in a controlled environment and more particularly concerns methods and apparatus for controlling a plant growing environment, which method and apparatus are of increased efficiency and convenience, and descreased cost.

It is will known that plants of all types are individually and uniquely adapted for optimum growth in individually specific environments. Thus, many attempts have been made to provide for controlled plant growing environments wherein temperature, moisture, and light, are controlled, and wherein undesirable organisms that may adversely affect the growth of the plants are excluded. However, control of plant environment has been accomplished in the past primarily by the construction of large, unwieldy, complex and exceedingly expensive structures. Where less compless complex and less expensive environment controls have been provided, only some of the desired environmental conditions have been achieved. Thus, for example, the patent to Landstrom et al, U.S. Pat. No. 4,567,732, shows an apparatus for complete control of a greenhouse environment incorporating substantial structures and a quantity of mechanical, electrical and electromechanical constructions for controlling light, heat, water, and the like within the greenhouse.

Going from the extreme of complexity exemplified by the patent to Landstrom et al, one finds a simple protection against frost and winds by a transparent covering draped over suitably mounted and shaped supports, as exemplified by the patent to Olshansky, U.S. Pat. No. 2,889,664. The arrangement of this patent, of course, is useful, to some extent, and economical, but provides relatively poor temperature control, little control of the light and moisture, and little protection from adverse organisms.

Accordingly, it is an object of the present invention to provide improved methods and apparatus for shelter of plants in a properly controlled and isolated environment, wherein disadvantages of prior devices are avoided or minimized.

SUMMARY OF THE INVENTION

In carrying out principles of the present invention in accordance with a preferred embodiment thereof, a plant shelter is composed of a first enclosure formed of thin, flexible, transparent material having means for blowing air into the enclosure to inflate it. A second enclosure superposed upon the first is also formed of thin, flexible, transparent material, but has a descreased light transmissivity. Air is caused to flow throught the first enclosure and from one end thereof into a corresponding end of the second enclosure to be returned through the second enclosure for recirculation as may be desired. According to a feature of the invention, a first enclosure formed of a thin, flexible, transparent material is inflated to provide a controllable plant growing environment, and means are provided above and at upper portions of the sides of the first enclosure for forming a sun shade for the first enclosure and for providing a thermal insulating air mass above and at upper sides of the first enclosure, to thereby control light and temperature within the controllable environment of the first enclosure. Air blown into the first enclosure to inflate it is caused to be recirculated by flowing from one end of the first enclosure into the second enclosure and back along the first enclosure through the length of the second enclosure, whereby the latter provides for air recirculation, thermal insulation, and sun shade.

BRIEF DESCRIPTION OF THE DRAWINGS

FIG. 1 is a pictorial illustration of a plant shelter embodying principles of the present invention, with parts broken away to show plants growing within the interior.

FIG. 2 is a vertical cross section of the shelter of FIG. 1.

DETAILED DESCRIPTION

Figure 3:
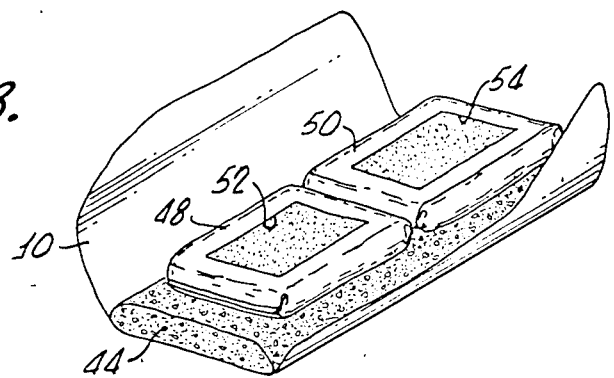
FIG. 3 is a detailed perspective illustration of an exemplary growing medium container within the shelter.

A plant shelter embodying principles of the prsent invention includes an enclosure formed by an inflated, closed tube 10 made of a thin, flexible, transparent material and which is sealed at a first end 12 and sealed and connected at a second end 14 to a blower housing 16. Tube 10 may be conveniently made of a section taken from a relatively long length or long roll of flattened tubing which is cut to a desired length and closed to seal the end 12. End 14 is gathered around the outer periphery of housing 16 and suitably sealed to the housing, as by a layer of self-adhesive tape, for example. Obviously the tube may be made in many sizes and in many thicknesses. Exemplary enclosures have been made with a tube of 20 to 50 feet in length, and 2 to 4 feet in diameter, using tubing having a 3 mil thickness. Preferably the material of which the tube is made is of the type that blocks or attenuates transmission of ultraviolet light. An agricultural mulch polyethylene plastic having restricted ultraviolet light transmissivity is presently preferred.

Suitably mounted within the blower housing 16 is a blower 18 having, in one arrangement, a motor of only about 0.21 watt power, which blows air through a conditioning device 20, schematically illustrated, which may be either an air heater, an air cooler, or a suitable air filter or other conditioner as may be deemed necessary or desirable.

A combined air return duct, thermal insulation air mass, and sun shade is provided by a shade sheet 30 which may be a roughly rectangular configuration sheet having its peripheral edge portion 32 continuously secured and sealed to the sides, front and back end portions of tube 10 along a line running around the periphery of the tub between the top and bottom of the latter. Conveniently, the peripheral edge portions of the shade sheet 30 are sealed to the tube 10 by a length of self-adhesive tape 34, which runs continuously around the tube and periphery of the shade sheet. The dimensions of the shade sheet are such that the width of the sheet from one side edge (connected to the tube at one side of the tube) to the other side edge, and the length of the sheet from one end to the other, are significantly greater than the comparable distances along the exterior surface of the tube so that the shade sheet, when inflated, will extend between points 33 and 35 (see FIG. 2)

on opposite sides of the tube and between corresponding points on the tube ends, so as to be spaced considerably above the top 37 of the tube and also above and to the outside of the upper portions of the tube sides and ends. The shade sheet is also made of a thin, flexible plastic, but has the interior thereof coated with a very thin metalic coating that provides between about 20 to 80 percent transmissivity of light. The shade sheet may also restrict transmission of ultraviolet light and is selected to provide a desired amount of shade. Materials known under the tradenames or trademarks of MYLAR, VAVAC, and GILA, may be employed for this shade sheet.

An aperture 36, formed in the upper portion of the tube 10 adjacent end 12, provides air flow from the interior of the tube to the interior of the air return and insulation duct 31 formed between the shade sheet 30 and the upper and lateral upper portions of the tube 10. A conduit 38 connects the front end of the return duct 31 adjacent tube end 14 to the interior of blower housing 16 a the input end of the blower 18 via a manually controlled valve 42 that allows the air returning from the return duct to flow either to the interior of blower housing 16 or to be vented to atmosphere.

Covering the interior of the bottom of closed tube 10, for its entire length and to a depth of several inches, is a bed of inert particulate matter, such as perlite or gravel 44. Any suitable type of plant growing medium or containers may be employed, resting directly on the bed 44. When a loose, unconfined soil medium is used, a sheet of thin, perforated plastic or similar material is positioned to completely and continuously cover the full length and width of the growing area, interposed between the bed of particulate material and the soil medium. It is presently preferred to employ as plant growing medium containers, plastic sacks 48,50 which rest on their sides on the bed 44 and have intermediate portions of their uppermost sides cut out, as indicated 52,54 (FIG. 3), to provide an area for growing plants. The sacks 48,50 may be of the type which are furnished with a pre-mixed growing medium sealed therein. After cutting out and discarding upper side areas, the lower surface of the plant growing medium containers are perforated with a number of holes so that roots of plants within the growing medium may grow through the holes into the particulate bed for greater stabilization and for access to moisture which may collect upon the surfaces of the particulate material of the bed. Excessive moisture that may accumulate in the particulate bed, as by over-watering for example, is readily removed by any suitable means. Conveniently, a number of lengths of absorbent material or wicks 52 of rope or knotted tubing of small diameter extend from points below the particulate bed surface, through the tube 10, to discharge liquids outside the tube at points below the bottom of the particulate bed.

Tube 10 rests directly upon the ground, which may be of any shape or configuration and on almost any inclination. Because of its flexibility, and of course the flexibility of the bed 44 which both weights the tube and provides a porous bed, the enclosures will readily conform to the configuration and contour of the supporting ground. If deemed necessary or desirable, suitable hoop-like restraining straps or bands 56,58 extend from points of securement at the ground on either side of the tube, over the tube, and over the shade sheet 30 to secure the shelter against displacement in the presence of high winds.

In setting up the described shelter, a desired length of plastic tubing 10 is selected, unwound from its rolls, and cut. The end 12 is closed or sealed in a suitable manner, and end 14 is connected and sealed to blower housing 16. The upper side of the tube along a line indicated at 60 is slit, for all or as much of the tube length as necessary, and the sides of the tube folded back to provide access to the interior for installation of the particulate matter bed 44, plant medium sacks 48,50 and to provide for the planting of the plants within the medium. After establishing the desired arrangement of the interior of the tube, the edges of the slit 60 are brought together and sealed in any suitable manner, as, for example, with a suitable length of a selfadhesive tape 62. Hole 36 is formed. Thereafter the blower is started to inflate the tube (or to reinflate it, if it had been inflated to facilitate slitting the tube for arrangement of its interior) to facilitate the positioning and attachment of the shade sheet 30. The latter is positioned on the top of the inflated tube 10 and the sheet edge secured, as previously described, to the outer surfaces of the inflated tube along the peripheral line 32 that is preferably at or below a plane extending longitudinally through the center of tube. For tubes of 2½ feet in diameter, for example, the plane of securement at line 32 of the shade sheet 30 is preferably about 8 inches above the upper surface of the particulate material bed 44.

After connecting conduit 38 as indicated, the shelter is ready for operation. The blower forces air into the interior of tube 10, inflating the tube with a pressure sufficient to make the inflated tube self-supporting. Pressure within the tube need be only a small amount above atmospheric pressure to make the shelter self supporting. Air under the increased pressure within the tube flows at a relatively low rate through the connecting passage or aperature 36 into the return air duct 31 formed between the interior of the shade sheet 30 and the exterior of the tube 10. Air flows back through the return duct to the passage 38 and vents, depending upon the position of valve 42, either to atmosphere or back to the intake of the fan, from which the air is recirculated.

Access to the interior of the tube, during operation, is readily available by making short slits in the sides of the tube below the peripheral edge of the shade sheet to provide openings for one or both hands. Perferably the diameter of the tube is such that the entire width of the tube may be readily reached through such openings from one or the other of the tube sides. Upon completion of desired operations within the operating shelter, the side slits may be readily re-seated, or may remain unsealed, with the loss of air that escapes through such unsealed slits being made up by increased flow of filtered outside air into the blower intake via an input filter 68. The various slits made for access and for initially setting up the interior can be provided with closures other than the simple and inexpensive tape. For example, more conventional repeatedly operable closures such as zippers, ziplock or other fastening means may be employed. The closable openings may also be resealed by heat sealing or adhesive.

When growth of the plants within the shelter is completed, harvesting is readily accomplished simply by cutting the tube open to provide complete access to the interior. The tube, materials and time and effort for assembly and installation are so small as to enable the entire plastic portion of the shelter to be discarded upon completion of a growing cycle. Of course the various conduits, blower housing and possibly some of the particulate material forming the bed may be reused.

Plants growing in the shelter require relatively little water, since they are growing in a closed environment from which little or no evaporation occurs. Water vapor in the air may condense upon the inner surfaces of the tube sides and flow down into the particulate material where it may be taken up by roots of the plants growing through the holes in the growing medium containers. Many other means of watering the plants within the shelter are readily available, for example, as illustrated in FIG. 2, a water hose having a thin, sharp nozzle may simple puncture the side of the tube 10 to enable watering of the plants within the container. More permanent systems, such as a drip system, may be employed if deemed necessary or desirable. The watering systems may be employed for application of chemical nutrients in precisely metered quantities.

Figure 5:
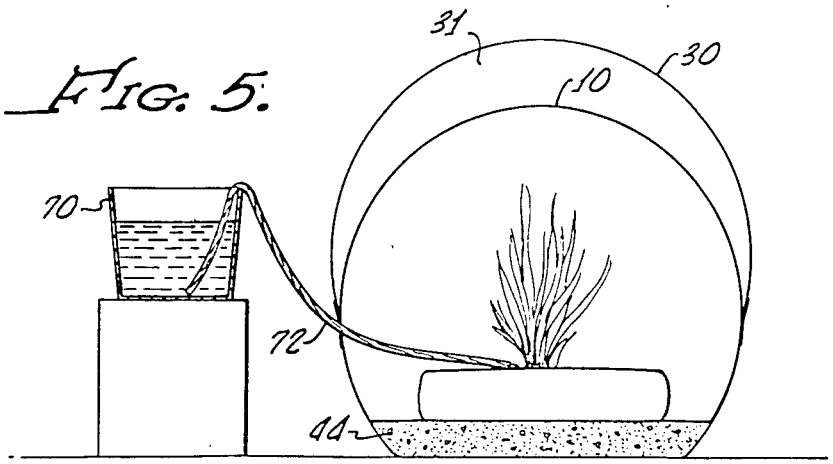
FIG. 5 illustrates one exemplary method of providing water to the interior of the shelter.

Illustrated in FIG. 5 is still another method of watering the plants within the container, comprising a water containing vessel 70 having a porous wick 72 extending from the inside of the vessle 70 through a suitable aperture in the side of the tube 10 and ending in or at the surface of the plant growing medium container. A plurality of such wicks may be provided as deemed necessary or desirable. Provision of only a small amount of water enables the shelter and its contents to remain unattended for long periods of time.

Figure 4:
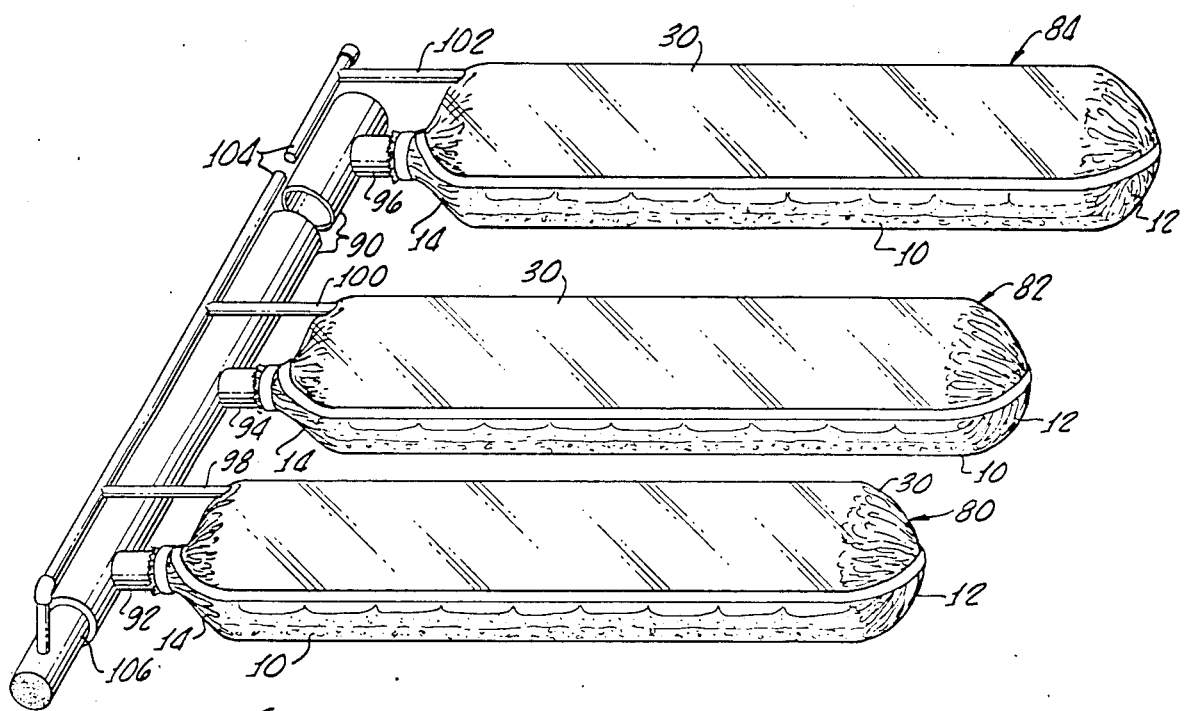
FIG. 4 illustrates the use of a plurality of plant shelters, coupled with a common blower manifold.

Illustrated in FIG. 4 is a modification of the sytem of FIGS. 1 and 2, wherein a plurality of plant shelters 80, 82, and 84, each substantially identical to the shelter shown in FIG. 1 (and each have a primary tube and a superposed shade sheet forming a combined return air duct and insulation air mass), are positioned on a suitable support or directly on the ground in side-by-side relation. Instead of providing a separate blower and housing for each shelter, the latter are all connected to a common plenum 90 by means of individual input conduits 92, 94, 96 through which air passes from the plenum into the interior of the tubes, and also having individual return passages 98, 100, 102 connected between the return air ducts of each and a common conduit 104, which connects to the input of a common blower 106 mounted to blow filtered or recirculated air into the interior of plenum 90.

If deemed necessary or desirable, artificial lighting may be provided within the interior of either the tube 10 or the return duct 31, as illustrated in FIG. 2, by a reflector 110 and a light source 112 carried on any suitable support, such as, for example, a light standard 114 having a base mounted in the particulate matter bed 44. One or more of such reflectors and light sources may be provided along the length of the shelter. Furthermore, because of the internal reflectivity of the metalic film on the interior surface of the shade sheet, a single light source at one end of the enclosure, directed to project light upwardly and rearwardly or forwardly against the interior surface of the sahde sheet, will provide reflected light over a relatively long area of the transparent tube 10.

Air flowing to the blower housing 16 of FIG. 1, or to the plenum 90 of FIG. 4, whether recirculating or freshly drawn in from the outside, may be conditioned, as by being suitably filtered, cooled or heated, to provide conditioned air to the tube interior. Although air suitably conditioned in temperature or particulate matter is provided continuously, the rate of air flow, and thus the velocity of air currents within the tube is very small. Nevertheless, there is a complete, continuous recirculation path for the air so that little or no outside air need be drawn in, thus providing isolation of the shelter interior from detrimental organisms such as weeds, insects, fungus and the like. Such outside air as is necessary may be readily filtered to ensure freedom of the plant environment from harmful organisms. Humidity of the circulating air is also readily controlled, merely by regulating the amount of water provided to the plants, either through a wicking system, drip system or other watering device. Since the environment is almost entirely confined, only a small amount of water need be added to the plants, and the humidity of the circulating air may be maintained at a relatively constant level, requiring only the energy consumption of the very small motor needed to drive the blower. For remote installations, or to further decrease the very small operating cost, solar or wind power may be employed to generate electricity to provide stored electrical power for blowers and air conditioners. Air of controlled temperature and humidity flowing through the return duct acts as a thermal insulating air mass, extending over the top and a major portion of the sides and ends of the tube 10, down to the point of connection between the shade sheet and the tube, so as to provide greatly improved temperature control of the shelter interior. Because air in the insulating duct 31 is recirculated and conditioned (as by cooling or heating) it provides still further improvement in temperature control. The decreased light transmissivity of the shade sheet of course also helps to control temperature and protects the growing plants from excess sunlight. Thus the shade sheet provides a multiplicity of highly desirable functions (shade, temperature control and recirculation) by a structure of maximum simplicity and minimum cost.

Because of the minimal requirement of the shelter for intake of air from the external environment, and the ready availability of adequate filtering of such external air, no insecticides, pesticides or fungicides or the like need be employed on the plants within the shelter. When starting with a sterile or otherwise controlled planting medium, no weeding is necessary.

The described plant shelter is readily adaptable to many different ground configurations and sloped and provides significant and optimally controlled plant growing facilities in non-arable areas, rocky soil, land that may otherwise be considered wasteland, or on relatively steep slopes. Although a specific cylindrical, horizontally oriented tubular configuration is illustrated and described, it will be readily appreciated that principles of the present invention are not limited to the described sizes, orientation, configurations or dimensions of the illustrated shelter and shade sheet.

It will be seen that there have been disclosed simple methods and apparatus for providing controlled and isolated plant growing environments, which require no insecticides, pesticides or fungicides, need no cultivation, and use very little water because of the recirculation of properly conditioned and humidified air. Humidity and temperature are readily controlled by control of air temperature at the blower and by the improved insulation afforded by the air mass in the return duct, which air mass itself is recirculated and controlled in temperature. The shelter may be utilized on various types of ground, including wasteland, and swampland, and because of its air inflation, has a degree of buoyancy that will allow for floatation in the liquid of a semi-liquid swamp-like support. The interior is readily accessible through slits cut in the sides of the enclosure and remains inflated because of the continued air input from the blower. Moreover, internal pressure keeps external air from flowing into the tube through the hand access slits so that only properly filtered air, and that in very small quantities, need be supplied from the outside, thus maintaining almost total isolation and avoiding entrance of undesired insects or other harmful organisms. The described shelter may also be employed as a dryer for various products and crops, including raisins, prunes, spices, and the like, by employing low humidity air to be blown through its interior. Further, pollination is enhanced by the recirculation of the confined air which carries pollen from plants growing within the shelter. Pollination may be further assisted by sharply pushing the tube sides inwardly at the level of blossoms to increase air flow over the blossoms or to physically contact portions of the plants to disturb loose pollen.

Thus, there is provided, according to the present disclosure, a substantially self contained and isolated plant growing environment of minimum cost, ease of erection and establishment, simplicity of operation, minimum energy requirements, and of controlled optimum growing conditions.

The foregoing detailed description is to be clearly understood as given by way of illustration and example only, the spirit and scope of this invention being limited solely by the appended claims.

What is claimed is:

1. A plant shelter comprising
   an at least partially sealed enclosure formed of thin, flexible, transparent material, and having top, bottom, side and end portions,
   a shade sheet formed of a material having a decreased light transmissivity, said shade sheet being secured and sealed to side and end portions of said enclosure and having at least an intermediate portion spaced above the top portion of said enclosure, said shade sheet and said enclosure forming therebetween a return air duct extending along at least the top portion of said enclosure,
   blower means for forcing air into said enclosure,
   said enclosure having a return passage at one end thereof providing fluid communication between said enclosure at said one end and the interior of said return air duct, and
   conduit means connecting the interior of said return air duct at a portion thereof remote from said return passage to said blower means, whereby air forced into said enclosure by said blower means is recirculated through said return air duct from said return passage and returned to said blower by said conduit means.

2. The plant shelter of claim 1 wherein said enclosure comprises an elongate airinflated tube of transparent plastic, and wherein said shade sheet comprises a sheet of plastic having a peripheral edge portion circumscribing said enclosure between the top and bottom portions thereof, said peripheral edge portion being secured and sealed to side portions of said enclosure substantially below said top portion.

3. The plant shelter of claim 1 including a bed of particulate material in said enclosure covering at least part of the bottom portion thereof, and a medium container resting on said bed of particulate material and having a plant growing medium therein.

4. The plant shelter of claim 3 wherein said medium container comprises a bag of plant growing medium having upper and lower sides, said lower side being in contact with said particulate material and having a plurality of drainage holes therein, said upper side having an interior portion thereof removed for acceptance of plants growing in said growing medium.

5. The plant shelter of claim 1 wherein said blower means comprises a manifold, a blower connected to pressurize said manifold, input duct means interconnecting said manifold with said enclosure, said conduit means being connected for communication of air between said return air duct and said blower.

6. The plant shelter of claim 5 including at least a second enclosure formed of thin, flexible, transparent plastic material having top, bottom, side and end portions, a second shade sheet formed of a material having decreased light transmissivity and secured and sealed to side and end portions of said second enclosure, said second shade sheet and second enclosure forming a second return air duct extending along at least the top portion of said second enclosure, a second return passage interconnecting one end of said second enclosure with one end of said second return air duct, second input duct means interconnecting said manifold with the interior of said second enclosure, and second conduit means for interconnecting said blower with said second return air duct.

7. The plant shelter of claim 1 wherein said shade sheet is formed of a thin plastic film having a thin metallic coating thereon, and including light source means postioned in said shelter for projecting light toward said shade sheet to be reflected internally by said shade sheet for providing illumination to plants growing within said shelter.

8. A method of growing plants in a sheltered environment comprising the steps of forming an enclosure of a thin, flexible, transparent plastic material, sealed from the environment,
   positioning a plurality of containers of plant growing medium in said enclosure,
   forcing air into said enclosure at one end thereof,
   securing and sealing peripheral edge portions of a thin, flexible shade sheet of descreased light transmissivity to a circumferentially extending external area of said enclosure,
   positioning an intermediate portion of said shade sheet at a location spaced from and outwardly of a longitudinally extending upper portion of said enclosure by flowing air from the other end of said enclosure into the space between the exterior of said enclosure and the shade sheet, and
   flowing air from the space between the exterior of said enclosure and said shade sheet at the other end of said enclosure into said first end of the enclosure.

9. The method of claim 8 wherein said step of positioning a plant growing medium container within said enclosure comprises the steps of cutting an opening in said enclosure, inserting said plant growing medium container into the enclosure through said opening, and closing said opening.

10. The method of claim 8 wherein said step of positioning a plant growing medium container within said enclosure comprises slitting said enclosure for a portion of the length thereof, inserting said plant growing medium container into said enclosure through the slit therein, and connecting the mating edges of the slit to re-seal said enclosure.

11. The method of claim 8 including the step of puncturing said enclosure by inserting a hollow conduit therethrough, forcing water through said hollow conduit to the interior of said enclosure, and withdrawing said hollow conduit.

12. The method of claim 8 including the steps of providing the interior of said enclosure with light by projecting light against the interior of said shade sheet to be reflected therefrom toward plants growing within said enclosure.

13. The method of claim 8 including the step of forming hand receiving slits in said enclosure to permit hand access to the interior of said enclosure, and continuing to force air into said enclosure.

14. A plant shelter comprising
an inflatable, sealed enclosure formed of thin, transparent material and having front, back and side portions,
means for defining a combined air return, thermal insulating duct and sun shade comprising a sheet of plastic material of decreased light transmissivity having a peripheral edge portion extending along both side portions of said enclosure and around front and back portions of said enclosure, said sheet cooperating with at least an upper portion of said enclosure to define said combined air return and thermal insulating duct therebetween,
means for connecting and sealing the peripheral edge portion of said sheet to the exterior of said enclosure, said sheet having a dimension between points of securement of its peripheral edge portions to said enclosure that is greater than the dimension of said enclosure between said points of peripheral securement whereby an intermediate portion of said sheet is displaced from an upper portion of said enclosure when said enclosure and said duct are inflated,
means for forcing air into said enclosure at one end thereof,
means for flowing air from the other end of said sealed enclosure to one end of the air return and thermal insulating duct, and
means for exhausting air from said air return and insulating duct.

15. The plant shelter of claim 14 wherein said means for exhausting air comprises conduit means for flowing air from an end of said return and insulating duct remote from said first mentioned end thereof to said means for forcing air into said enclosure.

16. The shelter of claim 14 including a support bed of particulate matter within said enclosure and extending along at least part of the bottom thereof.

17. The plant shelter of claim 14 wherein said sheet comprises a thin sheet of plastic having a metallic film on an inner surface thereof, whereby said sheet has diminished light transmissivity and increased light reflectivity on the interior thereof, and including lighting means within said enclosure for projecting light against the interior of said sheet for reflection back into the interior thereof.

18. The plant shelter of claim 14 wherein said sheet is connected to said enclosure at portions of the enclosure substantially below the top of the enclosure whereby said air return and insulating duct extend over the top and along at least upper portions of the sides of said sealed enclosure.

19. A plant shelter comprising
a first enclosure formed of a thin, flexible, transparent material,
means for blowing air into said first enclosure to inflate it,
a second enclosure superposed upon said first enclosure and formed of a thin, flexible, transparent material having a decreased light transmissivity, said first and second enclosures having a common wall positioned therebetween and effectively sealing the interior of said first enclosure from the interior of said second enclosure,
means for flowing air from one end of said first enclosure into a corresponding end of said second enclosure, whereby air blown into said first enclosure inflates said first enclosure and enters said second enclosure to inflate the second enclosure,
means for exhausting air from said second enclosure, whereby said second enclosure decreases the transmission of light into said first enclosure and provides a thermal insulation air mass above said first enclosure.

20. The shelter of claim 19 wherein said first enclosure is a closed tube, and wherein said means for exhausting air from said second enclosure comprises a blower having an input and an output, said input connected to the second end of said second enclosure, and said output being connected to the first end of said first enclosure whereby air blown into said tube is recirculated through said second enclosure.

21. The shelter of claim 20 wherein said second enclosure comprises a sheet of plastic extending over and spaced from the top and at least upper portions of the sides of said tube, said sheet having a peripheral edge portion continuously attached and sealed to the periphery of said tube, whereby said second enclosure extends over the top and along at least parts of the sides of said tube, and whereby an upper portion of said tube forms said common wall.

* * * * *